United States Patent
Kembaiyan (10) Patent No.: US 7,267,187 B2
(45) Date of Patent: Sep. 11, 2007

(54) BRAZE ALLOY AND METHOD OF USE FOR DRILLING APPLICATIONS

(75) Inventor: Kumar T. Kembaiyan, The Woodlands, TX (US)

(73) Assignee: Smith International, Inc., Houston, TX (US)

( * ) Notice: Subject to any disclaimer, the term of this patent is extended or adjusted under 35 U.S.C. 154(b) by 73 days.

(21) Appl. No.: 10/692,926

(22) Filed: Oct. 24, 2003

(65) Prior Publication Data
US 2005/0087371 A1   Apr. 28, 2005

(51) Int. Cl.
*E21B 10/567* (2006.01)

(52) U.S. Cl. .................. 175/434; 175/428; 175/435; 76/108.4; 228/121

(58) Field of Classification Search .......... 175/428, 175/432–435; 228/121; 76/108.4; 125/22; 420/504
See application file for complete search history.

(56) References Cited

U.S. PATENT DOCUMENTS

| | | | |
|---|---|---|---|
| 4,009,027 A * | 2/1977 | Naidich et al. ............ 228/121 |
| 4,052,531 A * | 10/1977 | Steine et al. ............... 420/504 |
| 4,453,605 A * | 6/1984 | Short, Jr. .................... 175/433 |
| 5,341,981 A | 8/1994 | Weise et al. |
| 5,352,542 A | 10/1994 | Voelcker et al. |
| 5,531,962 A | 7/1996 | Weise et al. |
| 6,299,835 B1 | 10/2001 | Weise et al. |

FOREIGN PATENT DOCUMENTS

| | | |
|---|---|---|
| DE | 2745409 | 4/1979 |
| EP | 1318268 A1 | 6/2003 |
| JP | 06136472 A | 5/1994 |
| JP | 2001087889 A2 | 4/2001 |
| NZ | 506379 | 12/2001 |

* cited by examiner

Primary Examiner—Lanna Mai
Assistant Examiner—Matthew J. Smith
(74) Attorney, Agent, or Firm—Y. Renee Alsander (57) ABSTRACT

A down hole cutting tool includes a cutting element support structure. The cutting element support structure has at least one cavity formed therein. A cutting element is disposed in the cavity. Braze alloy is also disposed in the cavity between the cutting element and the cutting element support structure. The braze alloy comprises between about 0.5% and about 10% by weight of at least one selected from the group of gallium (Ga), indium (In), thallium (Tl). Methods for building a down hole tool using the braze alloy are also disclosed.

34 Claims, 4 Drawing Sheets

BRAZE ALLOY AND METHOD OF USE FOR DRILLING APPLICATIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

1. Field of the Invention

The present invention relates to drilling tools for drilling bore holes in earth formations. More particularly, the present invention provides drilling tools and methods for manufacturing drilling tools which include the use of a new braze alloy for brazing cutting elements in drilling tool applications, especially cutting elements including ultrahard material, such as polycrystalline diamond.

2. Background Art

Figure 1:
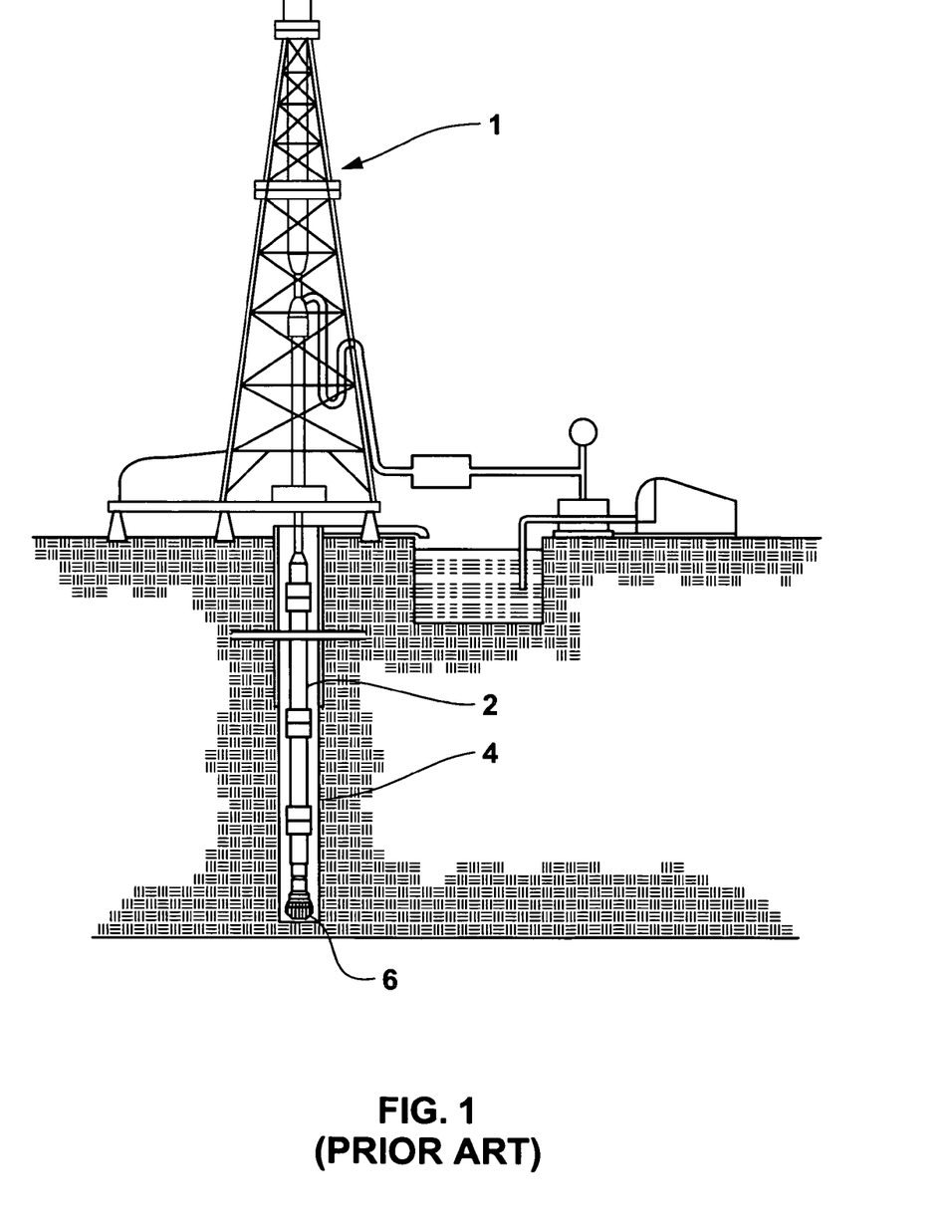
FIG. 1 shows one example of a conventional drilling system used for drilling bore holes in earth formations.

Earth boring tools, and in particular drill bits, are commonly used in the oil and gas industry for drilling well bores. FIG. 1 shows one example of a conventional drilling system for drilling through earth formation. The drilling system includes a drilling rig 1 used to turn a drill string 2 which extends downward into a well bore 4. Connected to the end of the drill string 2 is a drill bit 6.

Drill bits used for drilling well bores include roller cone drill bits and fixed cutter drill bits. Roller cone drill bits typically include a bit body with an externally threaded connection at one end, and a plurality of roller cones (typically three) rotatably attached to the other end. Attached to the cones of the bit is a plurality of cutting elements typically arranged in rows about the surface of the cones. The cutting elements may be inserts or milled steel teeth. Inserts are typically press-fitted into cavities (or pockets) formed in the surface of the roller cones. In certain applications, a hard surface layer or cap can be brazed onto the milled tooth cones of the roller cone bits. The inserts may include a layer of ultrahard material disposed thereon. Ultrahard material may be bonded to a substrate of the insert in a high temperature high pressure process known in the art.

Fixed cutter drill bits typically include a bit body having a threaded connection at one end and a plurality of cutting elements mounted at the other. The cutting elements are typically mounted in cavities formed around the bit body. In many drill bit designs, these cavities are arranged on blades formed on the bit body to accommodate the placement of the cutting elements on the drill bit. The cutting elements are brazed in the cavities by a braze alloy. The cutting elements typically are compacts which include an ultrahard material, such as polycrystalline diamond (PCD), bonded to a substrate. Ultrahard material may alternatively or additionally include material such as polycrystalline cubic boron nitride (PCBN) or polycrystalline carbonitride (PCN).

Other tools used during drilling operations may also include cutting elements which include ultrahard material, such as polycrystalline diamond or diamond containing material. These tools include other drill bits, reaming tools, fishing tools, milling tools, to name a few.

In general, cutting elements having ultrahard material, in particular diamond containing material, thereon must be brazed at temperatures below 1400° F., and more preferably below 1350° F., to avoid the onset of damage to the ultrahard material. This temperature restriction greatly limits the number of alloys that can be used as braze alloy for cutting elements with ultrahard material because most brazing alloys that provide sufficient shear strength for bonding cutting elements to a drill bit also require brazing at temperatures above 1350° F. Therefore, alloys suitable for brazing cutting elements with ultrahard material thereon have been limited to only a couple of alloys which offer low enough brazing temperatures to avoid damage to the ultrahard layer and high enough braze strength to retain cutting elements on drill bits. These alloys generally require brazing temperatures close to or at 1350° F.

Brazing at high temperatures, such as around 1350° F. has also been found to result in a build up of residual stresses in the ultrahard material which can increase the chances of cutting elements cracking and chipping during drilling. Residual stresses occur primarily due to difference in the coefficient of thermal expansion and differences in thermal conductivity of the diamond and the catalytic material used to form a polycrystalline diamond compact (or other diamond containing component). In addition to the residual stresses, polycrystalline diamond has a tendency to gradually revert back to carbon (graphite), which is accelerated at higher temperatures. As a result, cutters brazed at higher temperatures typically have a higher chance of cracking and chipping in the field because of the higher stresses developed due to exposure to brazing temperatures. Therefore, a braze alloy that can be used to braze cutting elements at a reduced brazing temperature is desired.

Additionally, in some drill bit designs, the bond formed between the cutting elements and the cutting element support structure (e.g., blades, cones, bit body surface, etc.) may be the weak link in the bit design. This is a primary reason for cutting element loss, which can result in over loading of adjacent cutting elements which can lead to premature failure of the bit. Additionally, when a cutting element falls out of its support structure on the bit, the fallen cutting element may get jammed against the bit, causing further bit damage and accelerating the premature failure of the bit. Accordingly, there is also a desire for a braze alloy offering increased braze strength to reduce the risk of cutter loss in some drill bit designs and, in some cases, to allow for the development of more aggressive drill bit designs.

SUMMARY OF INVENTION

The present invention provides a method for building a down hole cutting tool. In one aspect, the drilling tool includes a cutting element support structure. The cutting element support structure has at least one cavity formed therein to support a cutting element. The method includes placing a cutting element in the cavity and locating braze alloy such that when heated the braze alloy melts and fills a space in the cavity between the cutting element and the cutting element support structure. The braze alloy has a composition that includes about 0.5% to about 10% by weight of at least one selected from the group of gallium (Ga), indium (In), and thallium (Tl). The method further comprises heating the braze alloy such that it melts. In one or more embodiments, the method may also include cooling the braze alloy to form a bond between the cutting element and the cutting element support structure. In one or more embodiments, the drilling tool is a drill bit. In one or more embodiments the cutting element comprises a polycrystalline diamond (PCD), polycrystalline cubic boron nitride (PCBN), diamond or a diamond like carbon (DLC) material.

The present invention also provides a drilling tool. In one aspect, the drilling tool a cutting element support structure having at least one cavity formed therein. A cutting element is disposed in the cavity. Braze alloy is disposed in the cavity between the cutting element and surfaces of the cutting element support structure. The braze alloy comprises between about 0.5% and about 10% by weight of at least one selected from the group of gallium (Ga), indium (In) and thallium (Tl). In one or more embodiments, the drilling tool is a drill bit. In one or more embodiments the cutting element comprises polycrystalline diamond (PCD) or a diamond like material.

Other aspects and advantages of the present invention will be apparent from the following description and the appended claims.

DETAILED DESCRIPTION

The present invention provides down hole cutting tools and methods for manufacturing down hole cutting tools which include the use of an improved braze alloy that has been shown to be useful in drilling tool applications.

In one aspect, the present invention provides a down hole cutting tool which includes a braze alloy comprising between about 0.5% and about 10% by weight of at least one element selected from the group of gallium (Ga), indium (In), and thallium (Tl), or any combination thereof. The braze alloy may be used to braze cutting elements to a cutting element support structure (e.g., cutting face, blades, cones, etc.) of a drilling tool. The drilling tool may include a tool body with a cutting element support structure connected to or integrally formed with the tool body. The tool may comprise a drill bit such as a fixed cutter drill, roller cone drill bit, or a hammer bit. In other embodiments, the tool may comprise a reaming tool, a fishing tool, milling tool, hole opener, or similar tool. Because embodiments of the invention may include any type of tool used in drilling operations, how the cutting element support structure is connected to or configured with the tool body is not intended as a limitation on the invention.

In accordance with one or more embodiments of the invention, a cutting element support structure includes at least one cavity (e.g., pocket or recessed portion) formed in the cutting element support structure and adapted to accept a base portion of a cutting element therein. The cutting element may include ultrahard material, such as any material composition involving diamond.

When a drilling tool is assembled, the base portion of the cutting element is located in the cavity of the cutting element support structure and may be bonded or attached to the cutting element support structure by brazing. The brazing can be accomplished by placing a braze alloy in the cavity of the cutting element support structure between surfaces of the cavity and the base of a cutting element positioned (or to be positioned) therein. In some cases the brazing material may be placed in the cavity before the cutting element is positioned in the cavity. In other cases the cutting element may be placed in the cavity and the brazing material positioned in or located near the cavity such that when the brazing material is heated it melts and flows into the cavity between the cutting element and surfaces of the cavity. Heat is applied to the assembly and braze alloy to melt the braze alloy. During the heating process, the cutting element may be rotated to eliminate trapped gas pockets, inclusions, or voids and to ensure a complete, uniform coating of braze alloy between the cutting element and the cavity surfaces. The braze alloy is then cooled to form a bond between the cutting element and the cutting element support structure.

Example embodiments of drilling tools formed using a braze material as set forth above will now be described with respect to the attached figures, wherein similar reference characters are used for similar parts throughout the views for simplicity.

Figure 2:
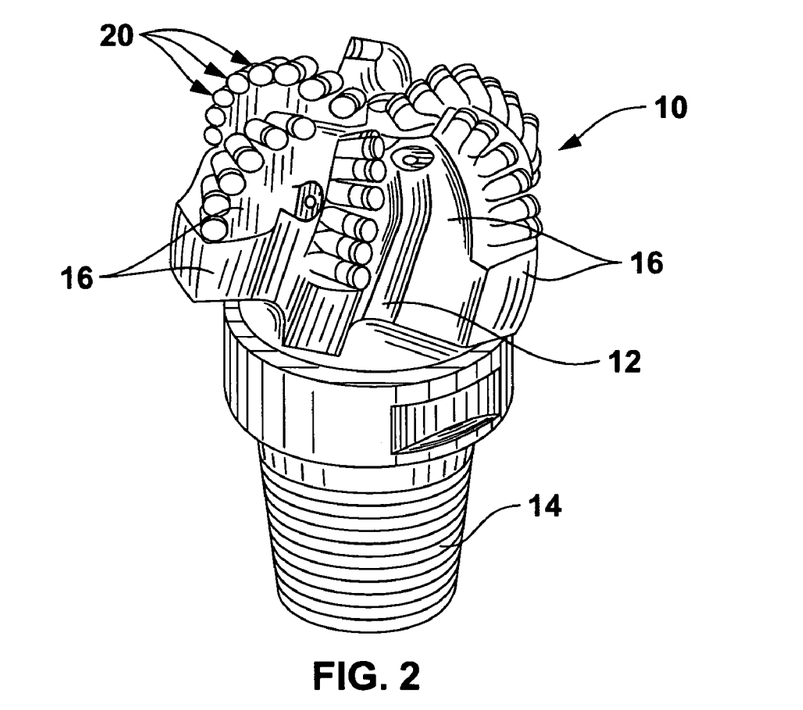
FIG. 2 shows a perspective view of a fixed cutter drill bit.

FIG. 2 shows a drill bit 10, which comprises a fixed cutter drill bit. The drill bit 10 includes a bit body 12. The bit body 12 may be formed of a matrix material, such as a tungsten carbide powder infiltrated with an alloy binder material, or may be a machined steel body. The bit body 12 includes a threaded connection 14 at one end for coupling the bit 10 to a drilling string assembly (not shown). The bit body 12 also includes a cutting element support structure which, in this example, comprises a plurality of blades 16. The blades 16 are radially arranged and extend outward at the other end of the bit body 12. Each of the blades 16 includes a plurality of cavities (26 in FIGS. 5 and 6) formed therein along the periphery to accept and support a base of a cutting element therein.

Figure 4:
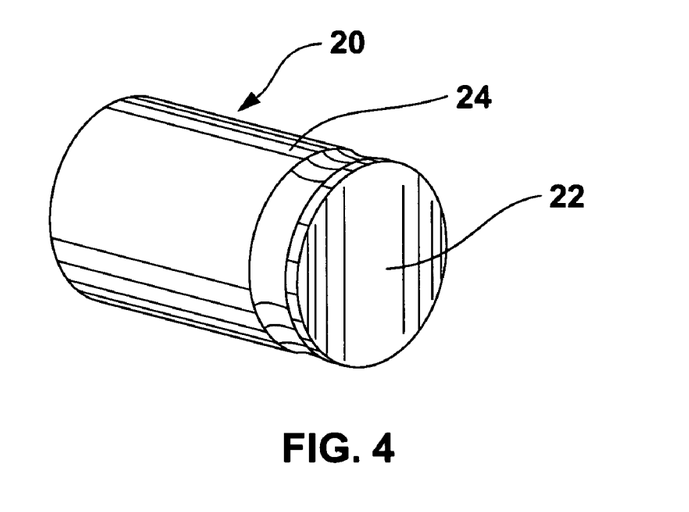
FIG. 4 shows a perspective view of one example of a PCD cutter for a fixed cutter drill bit.
Figure 5:
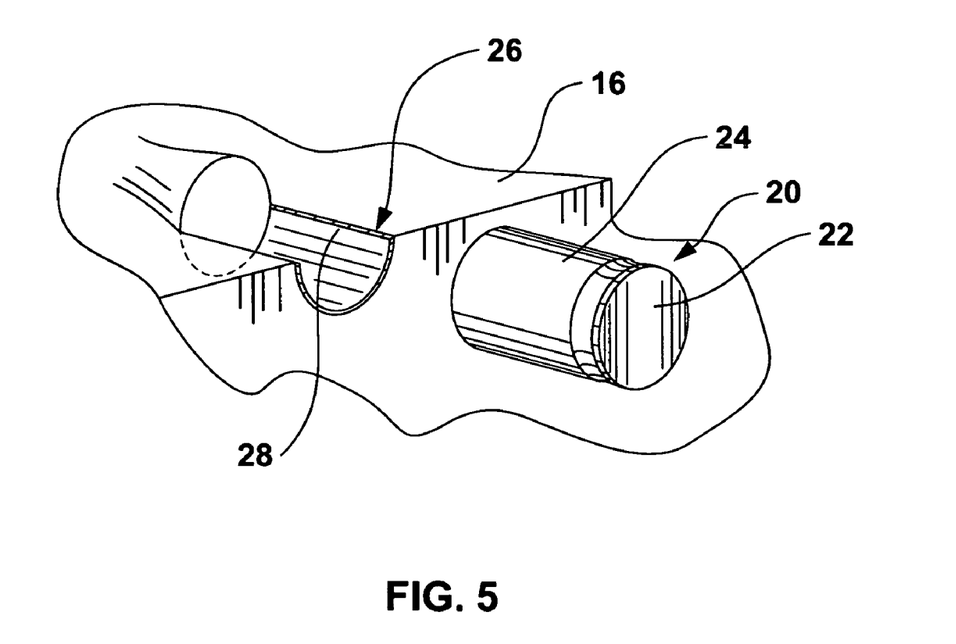
FIG. 5 shows a perspective view of a cavity formed on a fixed cutter drill bit with braze alloy along a surface thereof and a PCD cutter positioned to be placed in the cavity for attachment to the cutting element support structure by brazing.
Figure 6:
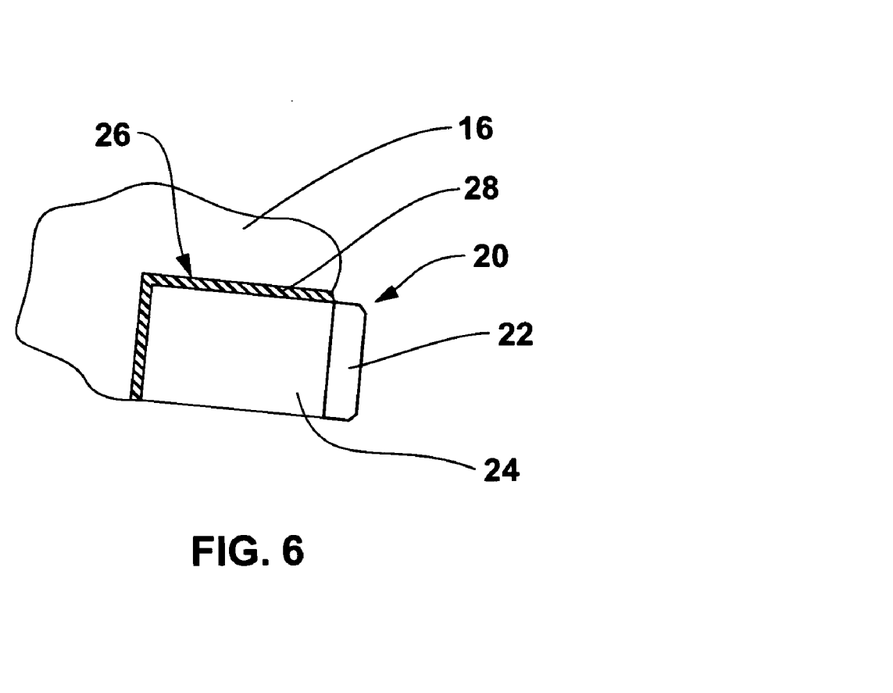
FIG. 6 shows a cross-sectional view of a cutter brazed in a cavity of a drill bit in accordance with an embodiment of the present invention.

The cutting elements in this example comprise polycrystalline diamond or diamond like compact cutters, which are hereafter be referred to as "PDC cutters" or "cutters" 20. A perspective view of a cutter 20 is shown for example in FIG. 4. FIG. 5, is an illustration of a cutter 20 to be inserted into a cavity 26 of a drill bit, wherein braze alloy 28 is disposed along the surface of the cavity 26. FIG. 6 shows a partial cross-sectional view of a cutter 20 brazed in a cavity 26 of a drill bit blade 16. As illustrated in FIGS. 4–6, a base portion of the cutter 20 is inserted in the cavity 26 of the blade 16 and fixed therein by brazing (braze alloy 28). In this example, the braze alloy 28 comprises between about 0.5% and about 10% by weight of at least one selected from the group of gallium (Ga), indium (In), and thallium (Tl), or any combination thereof. As shown in FIG. 2, the PDC cutters 20 are arranged to extend along the periphery of each of the blades 16 so that they engage with earth formation when the drill bit 10 is positioned on a bottom of a bore hole and rotated under an applied weight on bit.

In general, polycrystalline diamond or diamond like compacts have been used in industrial applications including rock drilling and metal machining for many years. Referring to FIG. 4, typically, in these applications, a compact of ultrahard material 22, such as polycrystalline diamond ("PCD"), is bonded to a substrate material 24 to form a cutter 20. The substrate material is typically a sintered metal-carbide, such as a tungsten carbide sintered with a cobalt binder. The ultrahard material 22 bonded to the substrate 24 sometimes referred to as a diamond table. The substrate 24 and ultrahard material 22 together form the PDC cutter 20. Methods for making diamond and composite compacts are described, for example in U.S. Pat. Nos. 3,745,623; 3,609,818; 3,850,591; 4,394,170; 4,403,015; 4,525,178; and 4,647546; and 4,954,139. One example of a prior art brazing method for drill bits is disclosed in U.S. Pat. No. 4,453,605, to Short, Jr, which is incorporated herein by reference.

Figure 3:
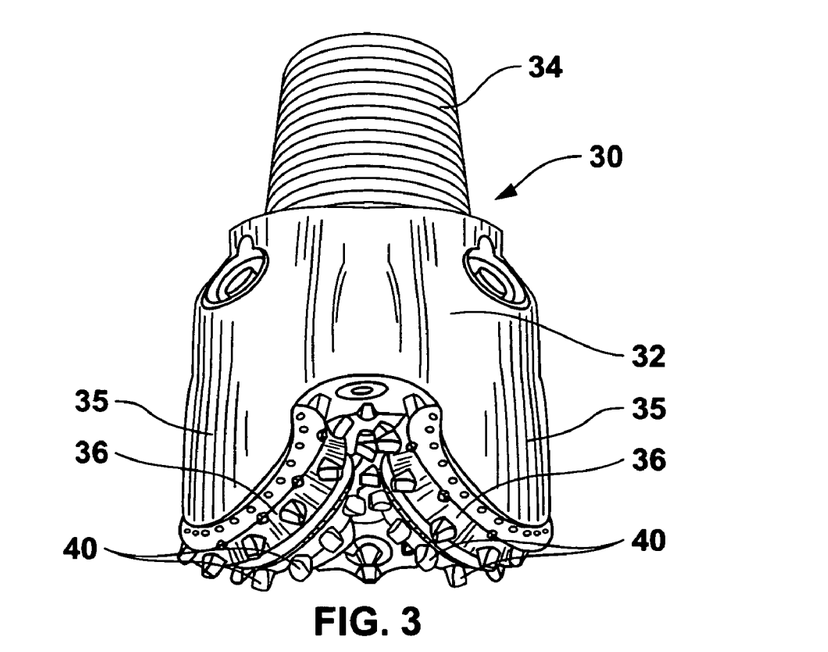
FIG. 3 shows a perspective view of a roller cone drill bit.

Cutting elements comprising ultrahard material may also be used on other types of drilling tools, such as roller cone drill bits, reaming tools, fishing tools, stabilizer blades, milling tools, and hole openers. For example, as shown in FIG. 3, a drill bit 30 may comprise a roller cone bit which includes a bit body 32. The bit body 32 may be formed of any suitable material such as matrix material or machined steel. The bit body 32 includes a threaded connection 34 at one end for coupling the bit 30 to a drilling string assembly (not shown), and a plurality of legs 35 extending from the other end. The cutting element support structure in this example comprises a plurality of roller cones 36 which are rotatably mounted to a cantilever journal (not shown) extending from each of the legs 35. Each of the roller cones 36 includes a plurality of cavities (not shown) formed its conical surface. Each cavity is adapted to accept and support a base of a cutting element therein.

Figure 7:
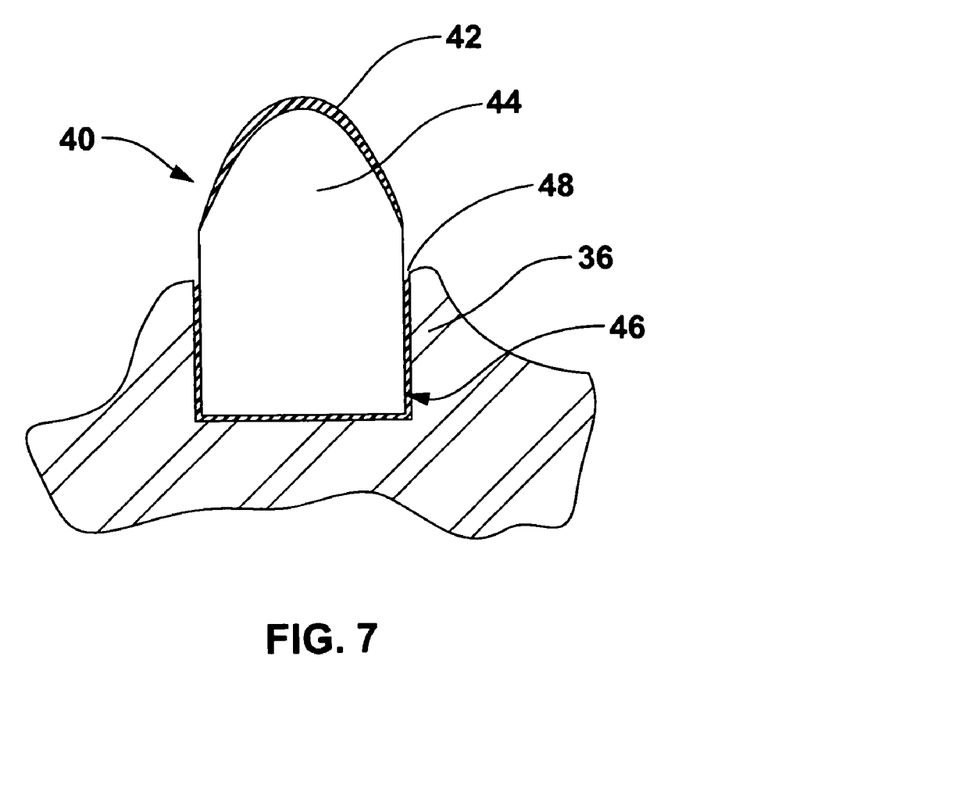
FIG. 7 shows a cross sectional view of an insert brazed into the cavity of a drill bit in accordance with an embodiment of the present invention.

In the example shown, the cutting elements comprise inserts 40. As shown in FIG. 7, an insert include a substrate 44 having a layer of ultrahard material 42 disposed thereon. The ultrahard material 42 may comprise polycrystalline diamond ("PCD"). The substrate 44 may be formed of any suitable material, such as tungsten carbide sintered with a cobalt binder. The insert in FIG. 7 is shown mounted in the cavity 46 of a roller cone 36 and fixed therein by brazing (braze alloy 48). The braze alloy 48 comprises between about 0.5% and about 10% by weight of at least one selected from the group of gallium (Ga), indium (In), and thallium (Tl), or any combination thereof.

As shown in FIG. 3, the inserts 40 are arranged to extend from the surface of each cone 36 so that they engage with earth formation when the drill bit 30 is placed on the bottom of a bore hole and rotated under an applied weight on bit. The drill bit 30 is designed such that when the inserts 40 on the cones 36 contact earth formation at on the bottom of a bore hole and the bit 30 is rotated, the cones 36 roll around the bottom of the bore hole forcing the inserts 40 to crush and gouge earth formation as the roller cones 36 rotate.

As previously stated, once a cutting element having a layer of ultrahard material, in particular a diamond containing material, is formed, the cutting element's exposure to high temperatures, especially temperatures above about 1350° F. should be avoided to prevent damage to the ultrahard material and to minimize the build up of residual stresses that can develop.

One conventional braze alloy commercially used for brazing cutting elements in drilling tool applications is known by the trade name "BAg-1." It is also referred by the SAE/ASTM Unified Numbering System (UNS) for metals and alloys by the number 'P07450'. BAg-1 has a typical composition of 44–46% silver (Ag), 14–16% copper (Cu), 14–18% zinc (Zn), and 23–25% cadmium (Cd). BAg-1 was originally the favored braze alloy in the industry because it offered sufficient braze strength (at the time) at the lowest brazing temperature, which was typically between 1250–1300° F. (675–700° C.). However, this alloy was later declared environmentally unfriendly because it contained cadmium, which was determined to be carcinogenic. As a result, the use of BAg-1 and other cadmium containing alloys was prohibited in many countries. This led to an industry wide shift to a braze alloy known by the trade name "BAg-7" (UNS number P07563), which is now considered the braze alloy of choice for many drill bit manufacturing applications.

BAg-7 has a typical composition of 55–57% silver (Ag), 21–23% copper (Cu), 15–19% zinc (Zn), and 4.5–5.5% tin (Sn). Although Bag-7 has a higher brazing temperature than BAg-1, is currently widely favored and used because it is cadmium-free and has the lowest brazing temperature, good braze strength, good wetting and flow of all of the cadmium-free alloys used for brazing. BAg-7 is typically used for brazing cutters with ultrahard material at temperatures of around 1350° F. (730° C.). BAg-7 is currently commercially available from braze alloy suppliers, such as Bellman-Melcor, Inc.

Because the brazing temperature required for BAg-7 is very close to temperatures that cause damage to ultrahard material, brazing must be performed at precise temperatures when brazing cutting elements with ultrahard material to avoid damaging the ultrahard material. Additionally, because brazing at higher temperatures can result in a build up of higher stresses that may lead to early failure of cutting element due to cracking, chipping, or delamination, a braze alloy that can be used to braze cutting elements at lower temperatures is desired.

There is also a growing desire for braze alloy that offers increased braze strength so that longer lasting drill bits and drill bits with more aggressive cutting structures, can be developed. The rate of penetration (ROP) achievable by a drill bit can be increased by providing drill bits that have more aggressive cutting structure designs, such as more aggressive cutting profiles. Particularly, in the case of fixed cutter bits, this may translate to more cutters on the bit, with the cutters arranged and oriented at more aggressive angles to gouge and break up more formation with each rotation of the bit. More aggressive cutting structures may be achieved by reducing the area available for brazing cutting elements to a cutting element support structure. Because braze strength is generally a function of braze alloy strength and braze area, reducing the braze area typically will result in a reduction in braze strength unless a braze alloy having a higher yield or shear strength is used.

In particular, rig rates are very expensive. Thus, time saved by drilling a well at a faster rate can result in large savings in the drilling operation. Well bores can be drilled at faster rates by, for example, using drill bits that achieve higher rates of penetration (ROP) and/or by using drill bits that last longer and, thus, can be used to drill longer segments of the well before being pulled to the surface for repair or replacement.

In general, the strength of an alloy may be increased by adding particular alloying elements to the alloy. However, conventional alloying elements typically added to a braze alloy to increase braze strength will also result in an increase in the melting point of the braze alloy, which means a higher brazing temperature. In brazing cutting elements with ultra-hard material, higher brazing temperature may result in thermal damage to the ultrahard material. Additionally, alloying elements typically used to decrease brazing temperature often result in a decrease in braze strength. As a result, braze alloys containing alloying elements other than those currently being used in standard alloys considered acceptable for drilling applications are typically not embraced as acceptable braze alloy alternatives.

Embodiments of the present invention provide drill bits and methods for brazing cutting elements, especially for temperature sensitive applications, that involve a braze alloy alloyed to contain one or more alloying elements that can be added to, advantageously, reduce brazing temperature and, in some examples, increased braze strength compared to conventional braze alloys used in drill bit applications that do not include these alloying elements.

In one embodiment, a method for brazing a cutting element to a drill bit includes placing braze alloy into a cavity of a cutting element support structure of the drill bit. The braze alloy includes about 0.5% to about 10% by weight of at least one selected from the group of gallium (Ga), indium (In), thallium (Tl). The method also includes inserting at least a portion the cutting element into the cavity. The method further includes heating the braze alloy such that it melts between the cutting element and the cavity, and cooling the braze alloy to form a bond between the cutting element and the cutting element support structure.

In accordance with the above method, gallium (Ga), indium (In), and/or thallium (Tl) may be added to conventional braze alloys used for drill bit applications to decrease the temperature required for brazing, and in some cases to also increase the resulting braze strength. Using a braze alloy as described above for drill bit applications may advantageously allow for the development of more aggressive drill bit designs.

In addition to the above elements, a braze alloy used in accordance with one or more embodiments of the invention may also include silver, copper, tin, and/or zinc. Braze alloys used for brazing cutting elements with ultrahard material thereon, typically includes at least 40% by weight silver (Ag). The braze alloy may include at least about 10% by weight copper (Cu). The braze alloy may include at least about 6% by weight zinc (Zn). The braze alloy may include at least about 2% by weight tin (Sn). In some embodiments, the braze alloy includes between about 40 wt % to about 60 wt % silver, about 10 wt % to about 40 wt % copper, about 6 wt % to about 30 wt % zinc, and about 2% to about 10% tin.

As stated above, braze alloy in accordance with embodiments of the present invention will also include about 0.5 wt % to about 10 wt % at least one selected from the group of gallium (Ga), indium (In), and/or thallium (Tl), or any combination thereof. In some embodiments, the amount of the at least one selected from the group of gallium (Ga), indium (In), and thallium (Tl), or any combination thereof will be between about 1% and about 8% by weight. In particular embodiment, the amount may be between about 2% and about 5%.

In one embodiment, the braze alloy that is used comprises around 3% of at least one selected from the group of gallium (Ga), indium (In), and thallium (Tl); and around 56% by weight silver, around 19% by weight copper, around 17% by weight zinc, and around 5% by weight tin. In a particular embodiment, the at least one selected comprises gallium (Ga).

In general, the inventor has determined that the addition of one or any combination of the above alloying elements may result in an improved braze alloy for brazing cutting elements of drill bits, especially for cutting elements that include ultrahard material thereon. In particular, these alloying elements may be used to lower braze temperature and/or increase braze strength of alloys used for drill bit applications compared to the conventional braze alloys.

For example, in one embodiment, a conventional silver-based braze alloy, such as BAg-7, alloyed to decrease its braze temperature and increase its braze strength by adding one or more elements selected from the group of gallium (Ga), indium (In), and thallium (Tl) may be used to braze PDC cutters to a fixed cutter drill bit. These elements can be added in any combination totaling between about 0.5% and about 10% by weight. Advantageously, adding one or more of these elements to the composition of the braze alloy may result in a braze alloy with a lower braze temperature than the conventional braze alloy, BAg-7. By providing a braze alloy that can be used to braze cutting elements a brazing temperature lower than that of the conventional braze alloy, can advantageously reduce the residual stresses developed in the ultrahard material of the cutting element during brazing. This may also result in a braze alloy having an increased braze strength over the conventional material.

Embodiments of the invention may also include braze alloys previously considered to be outside of the temperature range acceptable for brazing cutting elements with ultrahard material thereon. These braze alloys may be alloyed by adding between about 0.5% and about 10% of at least one element selected from the group of gallium (Ga), indium (In), and/or thallium (Tl), or any combination thereof to lower their braze temperature to a temperature more acceptable for these brazing applications.

Also, in one or more embodiments, braze alloys used in accordance with the descriptions above may contain small quantities of other elements, such as iron, silicon, phosphorous, sulfur, platinum, palladium, lead, gold, aluminum, magnesium, germanium, carbon, and oxygen. These elements may be present in trace amounts.

Referring to FIGS. 5 and 6, a braze alloy 28 in accordance with one of the above descriptions can be used to braze a cutter 20 in a cavity 26 of a drill bit (for example, 10 in FIG. 2). In this application, the braze alloy 28 is disposed between the surfaces of the cavity 26 and the substrate 24 of the cutter 20. The drill bit assembly is then preheated in a furnace and then additional heat is applied, such as by means of oxyacetylene torch, to the braze alloy 28 to melt the braze alloy 28 between the cutter 20 and the cutter cavity 26. Alternatively, the bit can be heated in a furnace along with the braze alloy in a controlled atmosphere. The bit is then removed and the braze alloy 28 is allowed to cool and solidify to form a metallurgical bond with the cutter 20 to the cavity 26. Cooling may be enhanced, such as by using fans, cooling fluid in contact with the bit body, or other cooling equipment. The result is a drill bit comprising a cutting element support structure having at least one cavity formed thereon for accepting a base portion of a cutting element. Braze alloy having a composition in accordance with an embodiment above is disposed in the at least one cavity between the base portion of the cutting element at the cavity surfaces of the cutting element support structure.

In considering various embodiments of the present invention, the inventor determined that a conventional braze alloy in accordance with an embodiment of the invention can be obtained from the company Degussa Löttechnik of Germany, and sold under the trade name "BrazeTec 5662." BrazeTec 5662 generally includes about 56% by weight silver, about 19% by weight copper, about 17% by weight zinc, about 5% by weight tin, and about 3% by weight gallium. This braze alloy is primarily considered for automotive, electrical and tooling applications. The braze alloy has not been sold or marketed for drill bit applications because it was not considered a successful option until identified by the inventor and tested to support the inventor's conclusion on acceptable alloying materials lowering braze temperature without sacrificing the braze strength and material properties required in a braze alloy used for drill bit applications. Based on tests performed using BrazeTec 5662, it has been determined that in accordance with embodiments of the present invention this material can be used as a good alternative braze alloy and offers some preferred brazing characteristics, such as lower braze temperature and higher shear strength when used to braze cutting elements of drill bits compared to conventional braze alloys currently being used in the drilling industry.

In particular, it was shown that BrazeTec 5662 could be used to successfully braze cutting elements on drill bits at temperatures around 1250° F., which is 100° F. lower than for the current braze alloy, BAg-7, currently used for these applications. The use of this braze alloy at the standard brazing temperature of around 1350° F. resulted in average cutting element push-out loads of around 24,000 pounds required to dislodge cutting elements from the pockets of the bit body material. The push-out load has been determined to represent the 'braze strength' of the braze alloy which represents the strength of the metallurgical/chemical bond between the cutting element and the cutter pocket. This is about 20% higher than that required to for cutting elements brazed using BAg-7 (which is typically about 20,000 pounds) as the braze alloy.

In another example, a cutting element was brazed at a temperature of about 1250° F. using BrazeTec 5662. The brazing temperature in this case is about 100° F. lower than the standard brazing temperature for these applications. In this case, the push-out load required to dislodge cutting elements was around 21,700 pounds. Thus, even at this lower brazing temperature use of BrazeTec 5662 resulted in a push out load of about 10% higher than that required using BAg-7 as the braze alloy and brazed at the standard brazing temperature of around 1350° F.

Those skilled in the art will appreciate that braze alloys in accordance with the present invention can be made using any manufacturing techniques well known in the art. Generally, such manufacturing techniques include melting the constituent compositional elements of the alloy together and forming an ingot from the molten alloy. After being produced, the particular braze alloy desired can be provided in a variety of forms suitable for brazing purposes.

The braze alloy in accordance with the present invention may be formed in any suitable manner known in the art or cast using any suitable technique known in the art into any desired form. For example, the braze alloys can be in a sheet form, strip form, wire form, rod form, foil form, powder form, shot form, chip form, paste form, etc.

In one or more embodiments, a braze alloy as described above may be used to braze a cutter to one selected from the group of a bit body such as fixed cutter drill bit body, an impregnated bit body, a hammer bit body or a milled tooth body, or any other down hole products, such as reaming tools, fishing tools, and stabilizer blades, milling tools, and hole openers. In one or more embodiments, a braze alloy in accordance with the above description may be used for brazing ultrahard material on the ends of cutting elements formed on milled tooth bits. In one or more embodiments, a braze alloy as described above may be used to braze diamond grit metal matrix inserts on to bit bodies. Diamond grit metal matrix inserts are formed from diamond grit hot pressed together with a metal binder material to form an insert.

In one or more embodiments, a braze alloy as described herein may also be advantageously used in applications where higher braze strength is desired without increasing the melting point of the braze alloy. In one or more embodiments, a braze alloy may be provided in a form such as one selected from the group of a powder, a disc, a wafer, a paste, and a wire. In one or more embodiments, braze alloy coated or impregnated base metals can be joined by any brazing process known in the art or described above.

Those skilled in the art will appreciate that in general braze alloy in accordance with one or more embodiments of the invention may be advantageously applied to any ultrahard material application involving a metal/diamond combination, because by an alloy which allows for alloying at lower temperatures without sacrificing braze strength will advantageously reduce the risk associated with damaging the diamond during brazing and may also result in lower residual stresses in the final product.

Embodiments of the present invention may include one or more of the following advantages. One or more embodiments may provide a method for brazing cutting elements which involves lower brazing temperatures to reduce the amount of residual stresses remaining in the ultrahard material of the cutting element after brazing. One or more embodiments may provide a drilling tool which includes a braze alloy with increased braze strength compared to that offered by conventional braze alloys used in these applications, such as BAg-7. One or more embodiments may advantageously allow for drill bits having more aggressive cutting structure designs. One or more embodiments of the invention may include a braze alloy alloyed to reduce the temperature required for brazing to decrease the residual stresses in the ultrahard material resulting from brazing. One or more embodiments of the invention may provide drill bits which have superior cutter retention, improved performance, and/or extended life over drill bits manufactured using conventional braze alloys for drill bit applications. Other advantages will be apparent to those of ordinary skill in the art.

While the present invention has been described with respect to specific embodiments and applications thereof, numerous alternatives, modifications, and applications, and variations will be apparent to those skilled in the art having read the foregoing description. The invention is intended to embrace those alternatives, modifications, and variations as fall within the broad scope of the appended claims. Accordingly, the scope of the invention should be limited only by the attached claims.

What is claimed is:

1. A method for building a down hole cutting tool, the cutting tool including a cutting element support structure having at least one cavity formed therein to support a cutting element, the method comprising:
    inserting a base portion of the cutting element into the cavity;
    locating a braze alloy such that when heated the braze alloy melts and fills a space in the cavity between the cutting element and the cutting element support structure, the braze alloy comprising silver in an amount of at least 40% by weight, copper in an amount of at least about 10% by weight, at least one selected from the group of zinc and tin, and about 0.5% to about 10% by weight of thallium (Tl) or thallium (Tl) and at least one selected from the group of gallium (Ga) and indium (In); and
    heating the braze alloy such that it melts.

2. The method of claim 1, wherein the locating comprises placing the braze alloy in the cavity prior to the inserting of the cutting element.

3. The method of claim 1, wherein the locating comprises placing the braze alloy proximal the space between the cutting element and the cutting element support structure.

4. The method of claim 1, further comprising cooling the braze alloy such that it bonds the cutting element to the cutting element support structure.

5. The method of claim 1, wherein the tool comprises a tool body and the cutting element support structure comprises a blade that extends radially from the tool body.

6. The method of claim 1, wherein the down hole cutting tool comprises a drill bit.

7. The method of claim 6, wherein the drill bit comprises a fixed cutter bit.

8. The method of claim 7, wherein the fixed cutter drill bit further comprises a bit body and the cutting element support structure comprises a blade formed continuous with the bit body.

9. The method of claim 1, wherein the cutting element comprises a substrate having ultrahard material disposed thereon.

10. The method of claim 9, wherein the ultrahard material comprises polycrystalline diamond.

11. The method of claim 1, wherein the braze alloy comprises both tin and zinc.

12. The method of claim 1, wherein the braze alloy comprises zinc in an amount of at least about 6% by weight.

13. The method of claim 1, wherein the braze alloy comprises tin in an amount of at least about 2% by weight.

14. The method of claim 1, wherein the braze alloy comprises between about 1% and about 8% of thallium (Tl) or thallium (Tl) and at least one selected from the group of gallium (Ga) and indium (In).

15. The method of claim 1, wherein the braze alloy comprises between about 2% and about 5% of thallium (Tl) or thallium (Tl) and at least one selected from the group of gallium (Ga) and indium (In).

16. The method of claim 1, wherein the braze alloy comprises around 3% of thallium (Tl) or thallium (Tl) and at least one selected from the group of gallium (Ga) and indium (In), around 56% by weight silver, around 19% by weight copper, around 17% by weight zinc, and around 5% by weight tin.

17. A down hole cutting tool, comprising:
a cutting element support structure having at least one cavity formed therein;
a cutting element having a base portion disposed in the cavity;
a braze alloy disposed in the cavity between the cutting element and the cutting element support structure, the braze alloy comprising silver in an amount of at least 40% by weight, copper in an amount of at least about 10% by weight, at least one selected from the group of zinc and tin, and between about 0.5% and about 10% by weight of thallium (Tl) or thallium and at least one selected from the group of gallium (Ga) and indium (In).

18. The tool of claim 17, further comprising a tool body, wherein the cutting element support structure is disposed on the tool body.

19. The tool of claim 18, wherein the cutting element supports structure comprises at least one radially extending blade integrally formed with the tool body, the blade having at least one cavity formed therein to support the cutting element.

20. The tool of claim 17, wherein the tool comprises a drill bit.

21. The tool of claim 20, wherein the drill bit is a fixed cutter drill bit.

22. The tool of claim 21, wherein the drill bit comprises a bit body and the cutting element support structure comprises a plurality of radially extending blades formed continuous with the bit body.

23. The tool of claim 20, wherein the bit comprises a bit body formed of at least one selected from steel and tungsten carbide infiltrated with an alloy binder.

24. The tool of claim 17, wherein the cutting element support structure is formed of at least one selected from the group of steel and tungsten carbide infiltrated with an alloy binder.

25. The tool of claim 17, wherein the cutting element comprises a substrate having ultrahard material disposed thereon.

26. The tool of claim 25, wherein the ultrahard material comprises polycrystalline diamond.

27. The tool of claim 17, wherein the braze alloy comprises both tin and zinc.

28. The tool of claim 17, wherein the braze alloy comprises zinc in an amount of at least about 6% by weight.

29. The tool of claim 21, wherein the braze alloy comprises tin in an amount of at least about 2% by weight.

30. The tool of claim 21, wherein the braze alloy comprises between about 1% and about 8% of thallium (Tl) or thallium (Tl) and at least one selected from the group of gallium (Ga) and indium (In).

31. The tool of claim 17, wherein the braze alloy comprises between about 2% and about 5% of thallium (Tl) or thallium (Tl) and at least one selected from the group of gallium (Ga) and indium (In).

32. The tool of claim 17, wherein the braze alloy comprises around 3% of thallium (Tl) or thallium (Tl) and at least one selected from the group of gallium (Ga) and indium (In), 56% by weight silver, around 19% by weight copper, around 17% by weight zinc, and around 5% by weight tin.

33. A down hole cutting tool, comprising:
a cutting element support structure having at least one cavity formed therein;
a cutting element having a base portion disposed in the cavity;
a braze alloy disposed in the cavity between the cutting element and the cutting element support structure, the braze alloy comprising silver in an amount of at least 40% by weight, copper in an amount of at least about 10% by weight, zinc in an amount of at least about 6% by weight, tin in an amount of at least about 5% by weight, and between about 2% to about 10% by weight of indium (In) or indium and at least one selected from the group of thallium (Tl) and gallium (Ga).

34. The down hole cutting tool of claim 33, wherein the braze alloy comprises about 2% to about 5% by weight of indium (In) or indium and at least one selected from the group of thallium (Tl) and gallium (Ga).

* * * * *